United States Patent [19]

Medlar

[11] 3,924,466
[45] Dec. 9, 1975

[54] MAGNETIC FLOWMETER WITH IMPROVED FIELD COIL

[75] Inventor: Lewis A. Medlar, Oreland, Pa.

[73] Assignee: Honeywell Inc., Minneapolis, Minn.

[22] Filed: Oct. 21, 1974

[21] Appl. No.: 516,647

[52] U.S. Cl. .......................................... 73/194 EM
[51] Int. Cl.² ........................................ G01F 1/58
[58] Field of Search ........ 73/194 EM; 335/213, 299

[56] References Cited
UNITED STATES PATENTS

| | | | |
|---|---|---|---|
| 2,831,136 | 4/1958 | Hanlet | 335/299 X |
| 3,587,019 | 6/1971 | Bull et al. | 335/213 X |
| 3,702,450 | 11/1972 | Avery et al. | 335/213 |
| 3,745,824 | 7/1973 | Mannherz et al. | 73/194 EM |
| 3,839,913 | 10/1974 | Asado | 73/194 EM |

Primary Examiner—Charles A. Ruehl
Attorney, Agent, or Firm—Arthur H. Swanson; Lockwood D. Burton; Lawrence J. Markoefer

[57] ABSTRACT

A magnetic flowmeter has a pair of coils each comprising a conductive pattern carried by a flexible insulating base. Each insulating base is wrapped partially around and secured to a cylindrical tube constructed of electrically insulating material. The patterns can be easily designed to produce a desired magnetic field pattern.

19 Claims, 11 Drawing Figures

MAGNETIC FLOWMETER WITH IMPROVED FIELD COIL

BACKGROUND OF THE INVENTION

1. Field of the Invention

This invention relates to a magnetic flowmeter and more particularly to a magnetic flowmeter which has an improved field coil structure.

2. Description of the Prior Art

In prior art magnetic flowmeters of the type to which this invention relates, an electromagnet is so disposed with respect to a flow tube that it produces a magnetic field whose direction is generally perpendicular to the direction of flow of a conductive fluid through the tube. The flow tube is so coupled in a pipeline that as fluid flows through the tube it interacts with the magnetic field. This interaction generates an electromotive force (EMF) which is orthogonal to both the direction of fluid flow and the direction of the magnetic field. The magnitude of the EMF is proportional to the rate of flow of fluid and a pair of electrically conducting probes in contact with the fluid detect this EMF to provide an output signal which can be calibrated in terms of the rate of fluid flow.

It is highly desirable that the inner diameter of the flow tube be approximately the same diameter as the inner diameter of the pipeline so it does not impede the flow of fluid. At the same time it is desirable that the other physical dimensions of the meter be as compact as possible so as to facilitate handling and placement of the meter in cramped surroundings. To make a physically compact magnetic flowmeter, the prior art has used flat wire coils distributed partially around the circumference of a reinforced fiberglass tube; see, for example, U.S. Pat. No. 3,745,824. While generally satisfactory, such magnetic flowmeters are relatively expensive to manufacture because it is difficult to accurately position the coils so as to obtain a desired magnetic field pattern. The problem is accentuated in those cases where it is desired to have a non-uniformly distributed field coil winding. For example, those skilled in the art have known for a number of years that an advantageous distribution of the magnetic field within the flow tube can be achieved with a so called cosine winding (see U.S. Pat. No. 3,490,282). That is, a field coil winding which is distributed around the circumference of the flow tube with a density of conductors that varies as a function of the cosine of the angular position of the conductors.

SUMMARY OF THE INVENTION

Among the objects of this invention is the provision of a magnetic flowmeter which has a flat field coil winding which is economical to manufacture and easy to position relative to the flow tube, even in cases where the coil is non-uniformly distributed. Another object of the invention is the provision of a magnetic flowmeter which has a relatively high resistance field in good thermal contact with the flow tube thereby providing a source of heat to prevent the buildup of unwanted deposits.

Briefly, this invention contemplates the provision of a field coil for a magnetic flowmeter in which the coil conductors are printed on a thin flexible insulating substrate. A pair of such coils are then laid upon and each wrapped partially around an insulating tube. The coils are cemented in place. In relatively high pressure applications, this assembly is then inserted inside of a section of structural pipe which also serves as a return magnetic path. Preferably, the insulating liner is made of a thermo setting plastic material so that it can be heated and expanded slightly to provide a close fit between the field coil and the pipe. For lower pressure applications, a thin sheet of magnetic material can be wrapped several times around the coil structure in order to provide a multi-layer return path and thus reduce the eddy current losses.

BRIEF DESCRIPTION OF THE DRAWINGS

For a more detailed description of the invention along with additional advantages and objects thereof, reference should be made to the following drawings which are to be read in conjunction with the specifications and form a part thereof. Like reference numerals are used to identify like parts in the various views, of which.

DESCRIPTION OF THE PREFERRED EMBODIMENT DETAILED DESCRIPTION

Figure 1:
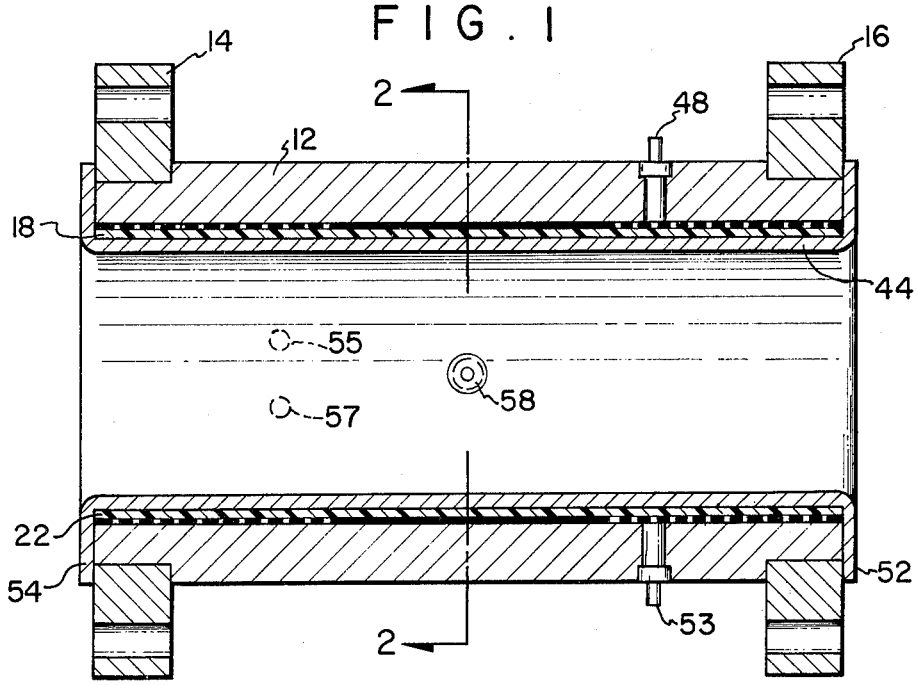
FIG. 1 is a longitudinal cross-sectional view of one embodiment of a magnetic flowmeter constructed in accordance with the teachings of this invention.
Figure 2:
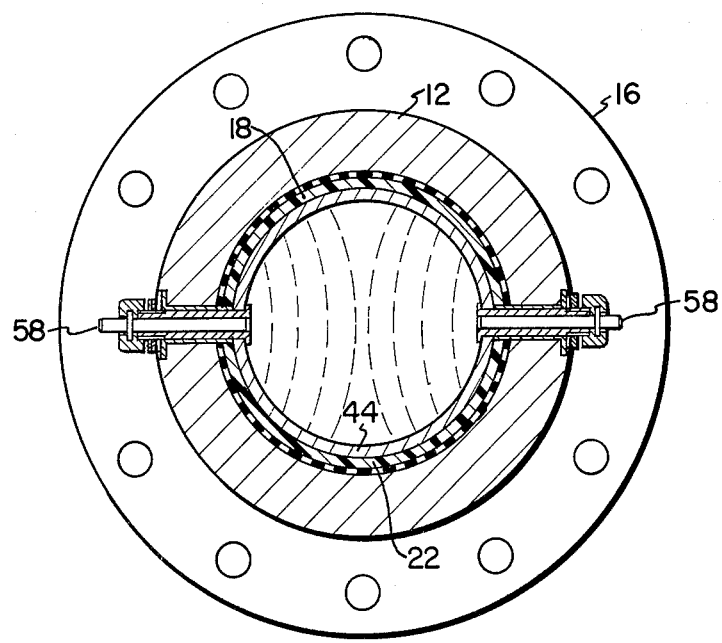
FIG. 2 is a sectional view taken along the line 2—2 of FIG. 1.

Referring now to FIGS. 1 and 2 of the drawings, a magnetic flowmeter used in measuring fluid flow rates of conductive fluids under relatively high pressures comprises a section of pipe 12 of magnetic material such as cast iron capable of withstanding the pressure of the flowing fluid. Flanges 14 and 16 are welded to each end respectively of the pipe section 12 and serve to position and secure the flowmeter between mating flanges in a pipe line (not shown).

Figure 3:
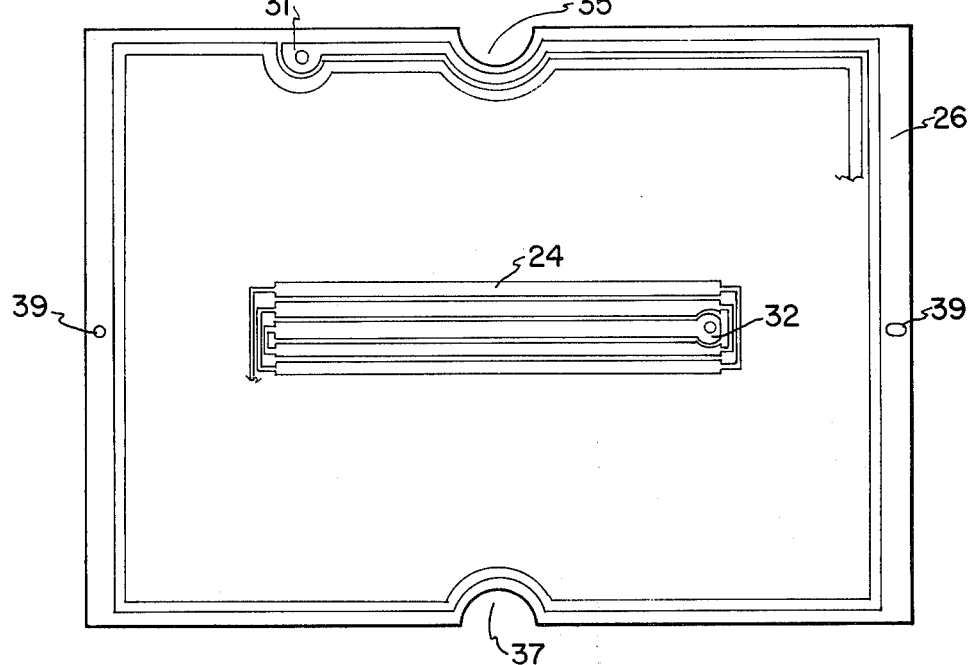
FIG. 3 is a plan view of one example of a field coil as it would appear laying on a flat surface.

A pair of field coils 18 and 22 produce a magnetic field which is substantially orthogonal to the longitudinal center line of the pipe section 12. Each of these field coils comprises a printed wire pattern on a flexible base such as a phenolic, mylar, or glass epoxy for example. FIG. 3 shows a typical pattern and construction of a field coil.

Referring now to FIG. 3 in addition to FIGS. 1 and 2, each of the field coils 18 and 22 comprises a flat conductive pattern, such as pattern 24 shown in FIG. 3, bonded to a thin flexible insulating base 26. Preferably the conductive pattern 24 is formed on the flexible insulating base 26 by printed wiring techniques well known to those skilled in the art. Typically, in such processes a copper conductive pattern is formed on the insulating base by a suitable photo-etching process. Electric power conductors for energizing the coil may be soldered to the enlarged areas 31 and 32 and the pattern is distorted slightly tò clear cut-out regions 35 and 37 which form openings for insertion of current sensing probes, as will be described more fully hereinafter. Holes 39 in the substrate may be used to assist in positioning the coil.

Figure 4:
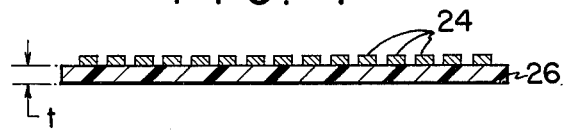
FIG. 4 is a fragmentary sectional view of the field coil winding shown in FIG. 3.

Referring now to FIG. 4 in addition to FIG. 3, the thickness $t$ of the insulating base is typically between 0.002 and 0.01 inches and the conductive pattern is between 0.001 and 0.005 inches thick. It will be appreciated that it is difficult at the present state of the printed wiring art fo form a conductive pattern more than 0.005 inches thick. In certain applications therefore, such as where a relatively large field current is desired, it will be preferable to have a field coil pattern that is thicker than that which can be produced with printed wiring technology.

Figure 5:
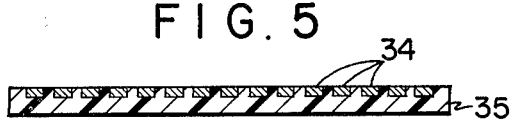
FIG. 5 is a sectional view similar to FIG. 4 illustrating an alternate embodiment of a field coil winding.

As shown in FIG. 5, a heavier conductor may be achieved by mechanically cutting a desired pattern into a flexible insulating substrate 35 and depositing a conductive material 34 such as copper in the cutaway portions of the substrate by suitable electro deposition techniques well known to those skilled in the art. In a different embodiment, rather than form the conductors by electro deposition, standard film insulated magnetic coil forming wire can be used and placed in the grooves cut into substrate. The grooves in the substrate can be cut so that they frictionally hold the wires in place.

Figure 6:
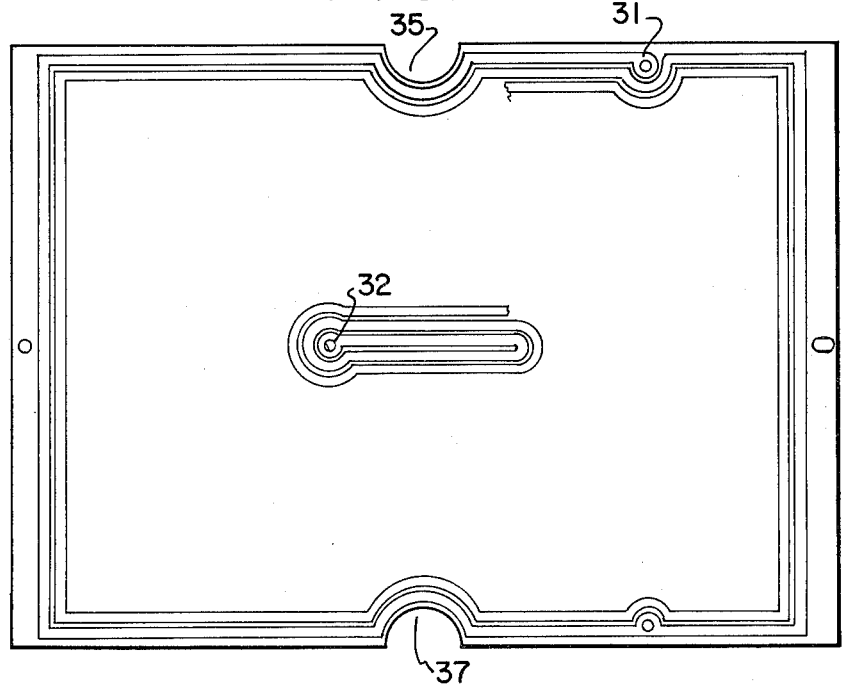
FIG. 6 is a plan view similar to FIG. 3 of another field coil winding which can be used in the practice of this invention.
Figure 7:
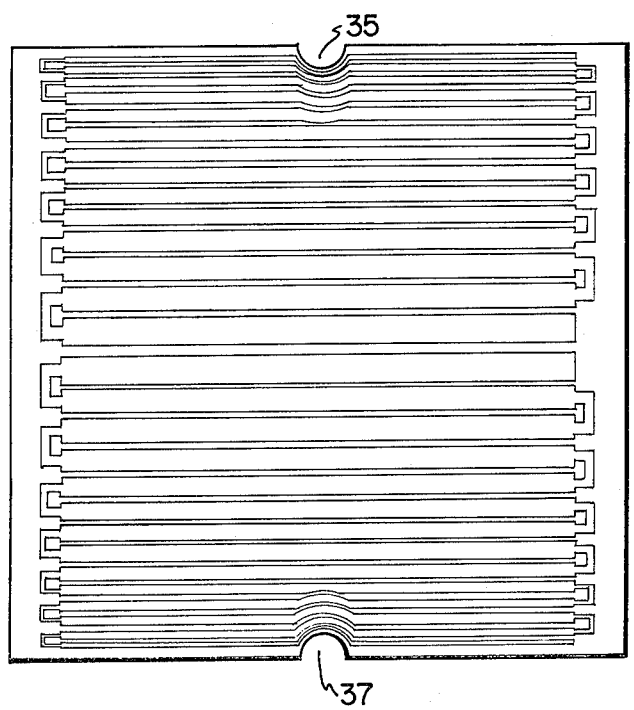
FIG. 7 is a view similar to FIGS. 3 and 6 of still another field coil.

It should be noted that the conductive pattern for the field coils thus described is precisely repeatable for each coil manufactured. Further, patterns for magnetic flowmeters of various diameters can be conveniently manufactured by merely enlarging or reducing the photographic mask used to make the pattern. In addition, a field coil having a complicated and even non-uniform distribution of conductors can be manufactured and installed readily. FIG. 6 shows a rectangular winding and FIG. 7 shows a cosine winding in which the conductor density varies as a function of the region in which the conductors are located. Such a cosine winding produces a uniform magnetic field throughout the flow path through the meter. It should be noted also that both field coil patterns can be formed on a single insulating base, if desired.

Figure 8:
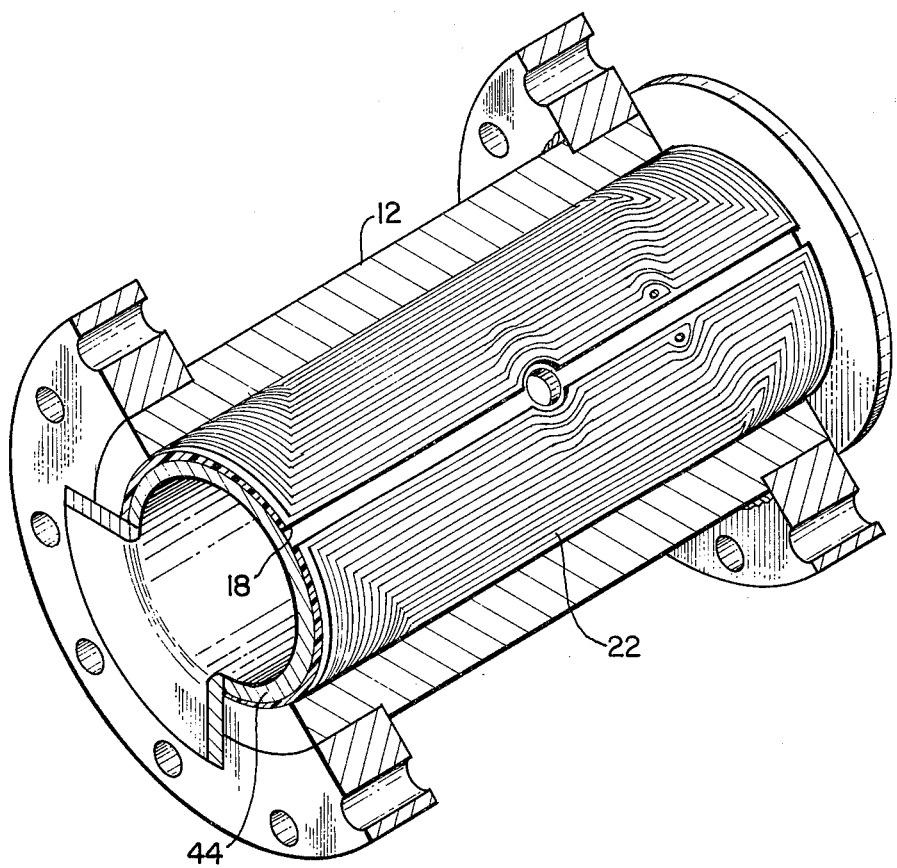
FIG. 8 is a isometric view of the meter shown in FIG. 1 with parts broken away and parts not shown to aid in visualizing the invention.

Referring now to FIG. 8 and FIGS. 1 and 2, a suitable adhesive such as epoxy bonds the field coils 18 and 22 to a flow tube 44 which is preferably made of an insulating thermo-setting plastic material such as glass epoxy. As will be apparent to those skilled in the art, the printed wire field coils can be precisely positioned with respect to tube 44 in order to produce a desired magnetic field distribution. Preferably, each coil covers substantially half the circumferential area of the tube 44.

The outside diameter of the sub-assembly comprising the field coils 18 and 22 and the liner 44 is preferably slightly smaller than the inside diameter of pipe 12 so that this sub-assembly can be inserted in the pipe section 12. After proper alignment with respect to the intended field coil power connection positions and current sensing probe positions, the assembly can be heated and the interior of tube 44 pressurized so that the tube expands slightly and forces the coil assembly into tight engagement with the interior wall of the pipe 12. While at an elevated temperature the ends of tube 44 can be turned to form flanges 52 and 54. It should be noted that the printed wire field coils can expand slightly without damage.

As can be noted from an inspection of FIGS. 1 and 2, the pipe section 12 serves as a magnetic field return path for the coils 18 and 22 and is tightly coupled to the coils due to the close and uniform spacing between the pipe 12 and the coils. This arrangement results in an efficient magnetic circuit. In addition, it should be noted that the field conductors are in close proximity to the tube 44. This field coil may be so designed that it has an appreciable internal resistance whereby the field current flowing through it generates appreciable heat in addition to the desired magnetic field. Because of the close proximity of the coil to the tube 44, the heat generated by the coil will raise the temperature of the tube and will thus prevent the buildup of grease on its interior surface.

Figure 9:
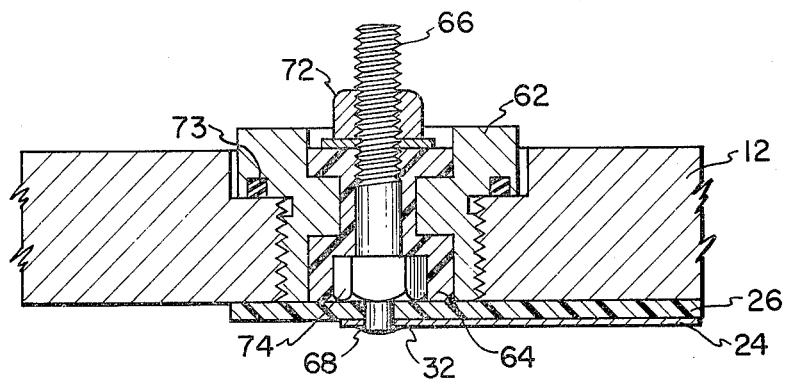
FIG. 9 is a sectional view of a terminal for connecting power to a field coil winding in a magnetic flowmeter constructed in accordance with the teachings of this invention.
Figure 10:
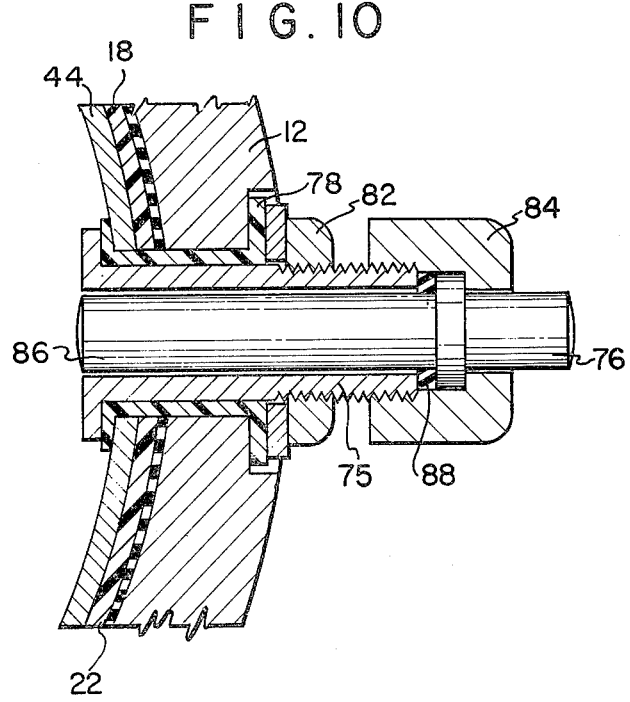
FIG. 10 is a sectional view showing details of a current sensing probe for use with a magnetic flowmeter of this invention.

One pair of connectors 48 and 55 provide a means for coupling power through the wall of pipe 12 to coil 18 and another pair of connectors 53 and 57 are coupled to the coil 22 respectively. FIG. 9 shows details of a preferred connector. Similarly, a pair of current sensing probes 58 are located along a line orthogonal both to the direction of fluid flow and the direction of the magnetic field; FIG. 10 shows a preferred embodiment of a sensor. It will be appreciated that any suitable prior art power supply and sensor output utilization apparatus known to those skilled in the art may be connected respectively to the power input connectors and the probes. Thus, such apparatus has not been described here as it does not form part of this invention.

Referring now to FIG. 9, a bushing 62 is screwed into a hole formed in the wall of the pipe section 12. An insulating member 64 bonded in a centrally disposed bore through the bushing 62 carries a power conductor 66. One end 68 of conductor 66 is soldered to an enlarged region 32 formed on the conductive pattern 24. A pair of nuts 72 and 74 secure conductor 66 in place while allowing its end 68 to be positioned so that it is substantially flush with the conductive pattern. An O-ring 73 prevents fluid leakage.

Referring now to FIG. 10, a bushing 75 supports a conductive probe 76 so that it is electrically insulated from both the wall of pipe section 12 and the field coils. The probe passes through the opening formed by the mating cut-out regions in the field coils. An insulating sleeve 78 prevents the bushing from contacting the pipe wall or the conductive pattern. A nut 82 secures the bushing in the wall of the pipe section, and a nut 84 secures the probe in the bushing with one end 86 of conductor 76 in the path of the flowing fluid. An O-ring 88 prevents fluid leakage.

Figure 11:
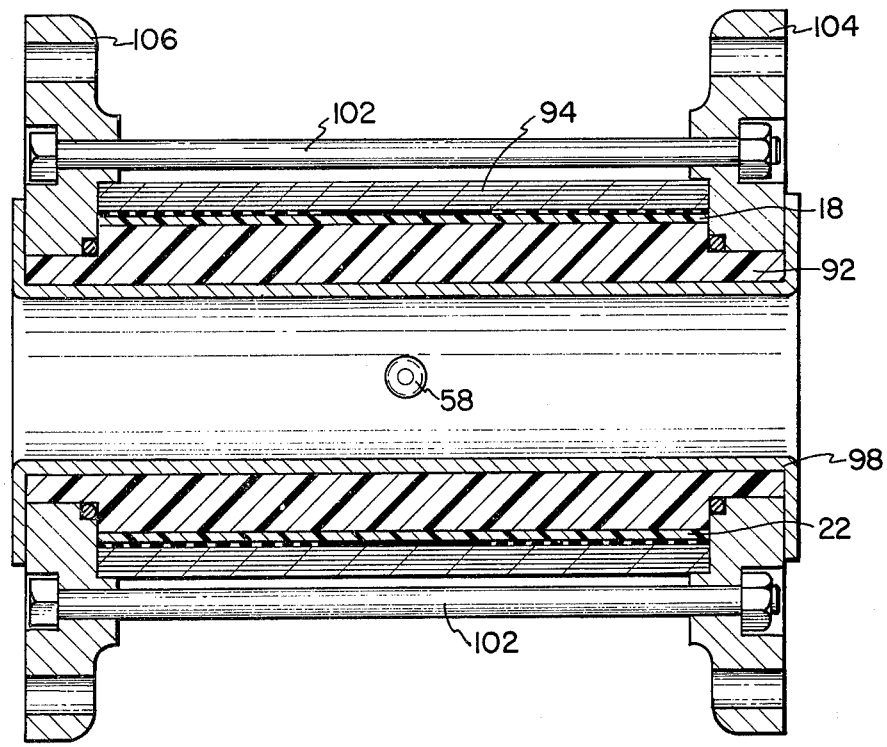
FIG. 11 is a cross-sectional view similar to FIG. 1 of an alternate embodiment of the invention.

FIG. 11 shows an embodiment of the invention which may be used in certain low pressure applications. Here the coils 18 and 22 are bonded to a cylindrical pipe section 92 made of an insulating material such as glass epoxy. A thin sheet of magnetic material such as cold rolled steel is wrapped around the coils to buildup a multi-layer magnetic return path 94 for the coils. It will be appreciated that the use of multiple layers of magnetic material is advantageous in that it reduces eddy current loss in the circuit. If desired a tube liner 98 may be employed to protect the plastic pipe section 92. Bolt 102 secure flanges 104 and 106 to the pipe section at its respective ends.

Thus, it will be appreciated that the object of the invention have been accomplished. The printed wire field coils provide a magnetic flowmeter of compact size which is economical to manufacture. Non-uniformly distributed winding can be easily positioned to produce a desired field.

The embodiments of the invention in which an exclusive property or privilege is claimed are defined as follows:

1. A magnetic flowmeter comprising in combination:
    a flow tube;
    a pair of electrical conducting coils for producing a magnetic field;
    each of said coils comprising a thin pattern of electrical conductors carried by a flexible electrically insulating base;
    means securing the flexible base for each of said patterns to said tube;
    a magnetic casing surrounding said pair of field coils and providing a magnetic return path therefore;
    means for coupling electric power to each of said coils; and
    means supporting a pair of probes so that the tip of each probe is disposed to contact a fluid flowing through said tube.

2. A magnetic flowmeter as in claim 1 wherein each coil pattern covers substantially one-half the circumferential area of said tube.

3. A magnetic flowmeter as in claim 2 wherein the density of conductors of the coil pattern varies as a function of region in which the conductors are located on the circumference of the tube.

4. A magnetic flowmeter as in claim 3 wherein said electrical conductors for each of said coils are formed in a planar pattern which produces a predetermined magnetic field in said tube when said coils are wrapped around the exterior surface of said tube.

5. A magnetic flowmeter as in claim 2 wherein said casing comprises a section of pipe capable of withstanding the internal pressure generated by the flowing fluid.

6. A magnetic flowmeter as in claim 2 wherein said casing comprises a plurality of layers of magnetic material wrapped around said field coils.

7. A magnetic flowmeter as in claim 2 wherein said electrical conductors for each of said coils are formed in a planar pattern which produces a predetermined magnetic field in said tube when said coils are wrapped around the exterior surface of said tube.

8. A magnetic flowmeter as in claim 1 wherein the density of conductors of the coil pattern varies as a function of region in which the conductors are located on the circumference of the tube.

9. A magnetic flowmeter as in claim 8 wherein said electrical conductors for each of said coils are formed in a planar pattern which produces a predetermined magnetic field in said tube when said coils are wrapped around the exterior surface of said tube.

10. A magnetic flowmeter as in claim 9 wherein said conductive pattern is a photographic reproduction of a master pattern.

11. A magnetic flowmeter as in claim 10 wherein said conductive pattern is smaller than said master pattern.

12. A magnetic flowmeter as in claim 10 wherein said conductive pattern is larger than said master pattern.

13. A magnetic flowmeter as in claim 1 wherein said casing comprises a section of pipe capable of withstanding the internal pressure generated by the flowing fluid.

14. A magnetic flowmeter as in claim 13 wherein said electrical conductors for each of said coils are formed in a planar pattern which produces a predetermined magnetic field in said tube when said coils are wrapped around the exterior surface of said tube.

15. A magnetic flowmeter as in claim 1 wherein said casing comprises a plurality of layers of magnetic material wrapped around said field coils.

16. A magnetic flowmeter as in claim 1 wherein said electrical conductors for each of said coils are formed in a planar pattern which produces a predetermined magnetic field in said tube when said coils are wrapped around the exterior surface of said tube.

17. A magnetic flowmeter as in claim 16 wherein said conductive pattern is a photographic reproduction of a master pattern.

18. A magnetic flowmeter as in claim 17 wherein said conductive pattern is smaller than said master pattern.

19. A magnetic flowmeter as in claim 17 wherein said conductive pattern is larger than said master pattern.

* * * * *